US007914864B2

(12) United States Patent
Sen et al.

(10) Patent No.: US 7,914,864 B2

(45) **Date of Patent: *Mar. 29, 2011**

(54) SYSTEM AND A METHOD FOR FORMING A HEAT FUSIBLE MICROPOROUS INK RECEPTIVE COATING

(75) Inventors: Radha Sen, San Diego, CA (US); Tienteh Chen, San Diego, CA (US); Robert Beer, Marly (CH); Kristina Gee, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/789,963

(22) Filed: Feb. 27, 2004

(65) Prior Publication Data

US 2005/0191445 A1 Sep. 1, 2005

(51) Int. Cl.

| | |
|---|---|
| ***B41M 5/52*** | (2006.01) |
| ***B41M 5/36*** | (2006.01) |
| ***G03G 5/10*** | (2006.01) |
| ***C08F 290/10*** | (2006.01) |

(52) U.S. Cl. ................ 428/32.17; 430/137.11; 524/366; 524/504; 523/201

(58) Field of Classification Search .................. 524/504, 524/366; 428/32.17; 430/137.11

See application file for complete search history.

(56) References Cited

U.S. PATENT DOCUMENTS

| | | | | |
|---|---|---|---|---|
| 4,172,064 | A * | 10/1979 | Keeler | 524/762 |
| 4,497,917 | A | 2/1985 | Upson et al. | |
| 5,242,888 | A * | 9/1993 | Atherton et al. | 503/227 |
| 5,461,125 | A | 10/1995 | Lu et al. | |
| 5,576,088 | A | 11/1996 | Ogawa et al. | |
| 6,375,320 | B1 | 4/2002 | Chen et al. | |
| 6,462,109 | B1 | 10/2002 | Sharma et al. | |
| 6,475,612 | B1 | 11/2002 | Knight et al. | |
| 6,872,278 | B2 * | 3/2005 | Lehman et al. | 156/327 |
| 7,086,732 | B2 * | 8/2006 | Kasperchik et al. | 347/105 |
| 2002/0155260 | A1 | 10/2002 | Chen et al. | |
| 2005/0009954 | A1 * | 1/2005 | Gebhard et al. | 523/210 |

FOREIGN PATENT DOCUMENTS

| | | |
|---|---|---|
| EP | 1 132 218 A1 | 9/2001 |
| EP | 1 318 025 A2 | 6/2003 |

* cited by examiner

*Primary Examiner* — Tae H Yoon

(57) ABSTRACT

A system for forming a microporous ink receptive coating includes a fusible latex configured to coat a substrate, wherein the fusible latex includes a hard core material and a soft shell material, wherein the latex exhibits self-adhesive properties at a system operation temperature.

21 Claims, 5 Drawing Sheets

SYSTEM AND A METHOD FOR FORMING A HEAT FUSIBLE MICROPOROUS INK RECEPTIVE COATING

BACKGROUND

In a typical ink jet recording or printing system, ink droplets are ejected from a nozzle towards a recording element or medium to produce an image on the medium. The ink droplets, or recording liquid, generally include a recording agent, such as a dye or pigment, and a large amount of solvent. The solvent, or carrier liquid, typically is made up of water, an organic material such as a monohydric alcohol, a polyhydric alcohol, or mixtures thereof.

An image recording element typically includes a substrate having at least one porous ink-receiving surface or image-forming layer. A preformed solid latex layer has also traditionally been formed over the ink-receiving surface to provide protection and image enhancement to the porous ink-receiving surface.

While the solid latex layer does enhance and protect the ink formed image, it also presents a number of issues. Traditionally, the latex layer has been formed including a large quantity of binder material, such as water soluble polymers, to keep the latex layer together and to facilitate the adherence of the latex layer to the porous substrate. While the binder material facilitated the adherence of the latex layer to the porous substrate, large quantities of binder material also reduce the porosity of the latex layer and consequently decrease the penetration rate of ink through the latex layer and into the porous ink-receiving layer beneath. Moreover, incompatibility between binders of a top and a bottom layer often cause internal haze. This undesirable haze was exaggerated when exposed to heat and/or pressure.

SUMMARY

A system for forming a microporous ink receptive coating includes a fusible latex configured to coat a substrate, wherein the fusible latex includes a hard core material and a soft shell material, wherein the latex exhibits self-adhesive properties at a room or system operation temperature.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

Traditional methods for one pass coating of a microporous layer on top of another microporous base layer experienced incompatibility of binders in the top layer and the bottom layer. This incompatibility caused internal haze, which is made worse under heat and pressure. Additionally the presence of cross linkers and hardeners arriving into the layer through migration during the process of coating cause the binder in the top to become either brittle, having a tendency to crack, or to form a gel structure leading to gel particulates and other type of defects related to visco-elasticity. The above issues can be eliminated if the surface layer did not have any binder at all. However, in the absence of a binder, some means of adhering the latex particulates is needed.

An exemplary method and apparatus for generating a microporous ink receptive coating using little to no binder material is described herein. More specifically, a microporous substrate is coated with an optically clear or translucent layer of hard core/soft shell latex configured to adhere to itself with little or no binder. Once coated onto a microporous substrate, the layer of hard core/soft shell latex provides a porosity sufficient to allow the printing of an image onto the microporous substrate. Once printed, the layer of hard core/soft shell latex may be sealed by heat and/or pressure to form a single continuous film. The present specification discloses the composition of an exemplary coating and various exemplary methods that can be used to generate a binder free microporous ink receptive coating on a substrate.

As used in this specification and in the appended claims, the term "substrate" is meant to be understood as any medium, planar or non-planar, configured to receive a coating or an image. A "glass transition temperature" is meant to be understood as a temperature under which polymers are rigid and brittle and somewhat elastic above it. Moreover, the term "binder" is meant to be understood as any additive used to bind separate particles together or facilitate adhesion to a surface.

In the following description, for purposes of explanation, numerous specific details are set forth in order to provide a thorough understanding of the present system and method for generating a binder free microporous ink receptive coating using hard core/soft shell latex. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
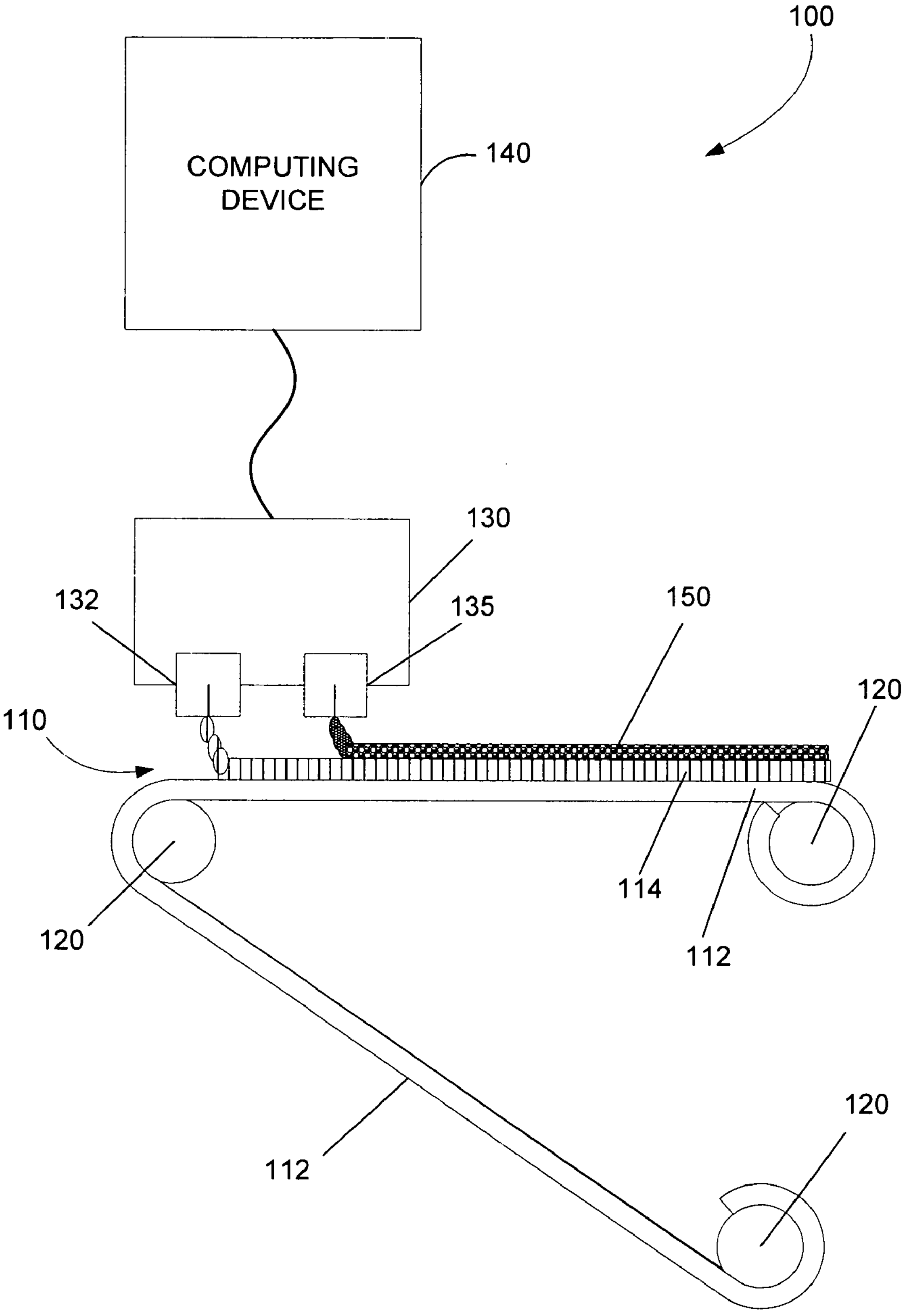
FIG. 1 is a perspective view of a system that may be used to implement exemplary embodiments of the present system and method.

FIG. 1 illustrates an exemplary system (100) that may incorporate the present method of generating a binder free microporous ink receptive coating using hard core/soft shell latex. As shown in FIG. 1, an exemplary coating system (100) may include a coating applicator (130) including a number of coating dispensers (132, 135) disposed adjacent to an ink receptive medium (110) made up of a photo or film base (112)

having a microporous substrate (114) disposed thereon. According to one exemplary embodiment as shown in FIG. 1, the ink receptive medium (110) may be disposed on a medium transport device (120) including a number of rollers configured to position the ink receptive medium (110) during a coating operation. Additionally, a computing device (140) may be communicatively a coupled to the coating applicator (130).

The coating applicator (130) of the coating system (100) illustrated in FIG. 1 may be either a stationary or a moveable material dispenser having at least one coating dispenser (135) configured to dispense a hard core/soft shell latex material (150) and, according to one exemplary embodiment, a second coating dispenser (132) configured to dispense a microporous substrate (114). The coating applicator (130) and its associated coating dispensers (132, 135) may be controlled by a computing device (140) and may be controllably moved by, for example, a shaft system, a belt system, a chain system, etc. According to one exemplary embodiment, the coating applicator (130) may include, but is in no way limited to, a slot applicator, a roll applicator, a cascade applicator, a slide applicator, a blade applicator, inkjet dispensers, or any other known liquid coating technique. Additionally, according to one exemplary embodiment, the one or more coating dispensers (132, 135) may be coupled to a number of hard core/soft shell latex reservoirs (not shown). According to this exemplary embodiment, the coating dispensers (132, 135) are supplied hard core/soft shell latex (150) or microporous substrate (114) material via the reservoirs. Additionally, according to one exemplary embodiment, one or more hard core/soft shell latex coating applicators (130) may be coupled to a number of hard core/soft shell latex reservoirs (not shown). According to this exemplary embodiment, the hard core/soft shell latex coating applicators (130) are supplied hard core/soft shell latex via the reservoirs.

FIG. 1 also illustrates a medium transport device (120) configured to controllably position an ink receptive medium (110). As shown in FIG. 1, the medium transport device may be any device capable of controllably positioning an ink receptive medium including, but in no way limited to, a conveyor belt, a number of rollers, robotic arms, etc.

The ink receptive medium (110) illustrated in FIG. 1 is configured to receive a hard core/soft shell latex coating and a recording agent. As shown in FIG. 1, the ink receptive medium (110) may include, but is in no way limited to a photo or film base (112) having a microporous substrate (114) disposed thereon. According to one exemplary embodiment, the photo or film base (112) may include any photo base or paper base material. Additionally, according to one exemplary embodiment, the present hard core/soft shell latex coating may be coated on a previously coated latex lattice. As shown in FIG. 1, a microporous substrate (114) is disposed on the photo or film base (112) immediately preceding the deposition of the hard core/soft shell latex (150), according to a wet on wet configuration. The microporous substrate (114) may be any material configured to receive a recording agent including, but in no way limited to, a microporous inorganic composition such as fumed silica, colloidal silica, fumed aluminum, or colloidal aluminum; calcium carbonate; polymeric membrane; a plastic pigment; or a previously coated latex lattice.

The computing device (140) illustrated in FIG. 1 may cause one or more coating applicators (130) to controllably dispense or coat a desired ink receptive medium (110) with a hard core/soft shell latex coating at predetermined locations. Moreover, the computing device (140) may be configured to monitor and/or control the present system and method. System and process information may be presented to a system operator via a user interface (not shown) that forms a part of the present computing device (140). A more demonstrative cross-sectional view of the coating system (100) of FIG. 1 is presented in FIG. 2.

Figure 2:
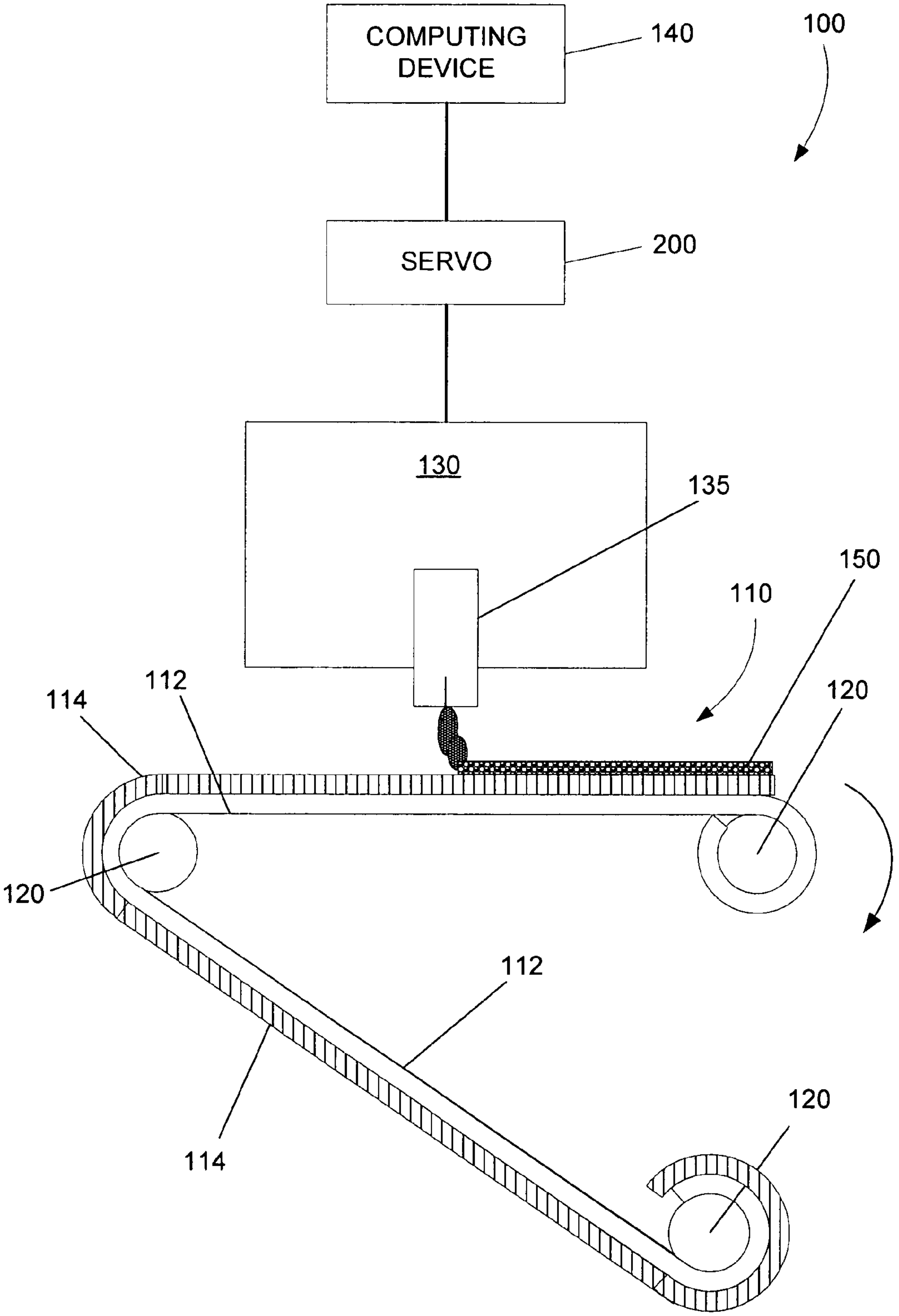
FIG. 2 is a cross-sectional view of a system that may be used to implement exemplary embodiments of the present system and method.

As shown in FIG. 2, the computing device (140) may be communicatively coupled to a servo-mechanism (200). The computing device (140) may be configured to communicate commands to the servo-mechanism (200) causing it to selectively position the coating applicator (130). Additionally, the computing device may communicate commands that cause the coating applicators (130) to selectively dispense a layer of hard core/soft shell latex (150) on an ink receptive medium (110) as shown in FIG. 2. FIG. 2 also illustrates a coating applicator having a single coating dispenser (135). According to this embodiment, the hard core/soft shell latex (150) is dispensed onto a pre-formed ink receptive layer (114) according to a wet on dry method. The system and method for using the exemplary coating system (100) illustrated in FIG. 2 will be described in detail below with reference to FIG. 3 through FIG. 4D. Moreover, composition, interaction, and functions of the hard core/soft shell latex (150) will be described in further detail below.

Exemplary Compositions

One exemplary embodiment of the present system and method for generating a binder free microporous ink receptive coating is based on employing a hard core/soft shell latex (150) that includes a hard center having a high glass transition temperature (Tg) and a soft latex shell having a low glass transition temperature (Tg). Once the hard core/soft shell latex (105) coats a desired substrate, the soft shell portions become tackified at room or system operating temperatures and adhere to one another. A recording medium may then be deposited on the hard core/soft shell latex (105). Once an image printing process has been performed, the top layer may be fused using heat and/or pressure to form a continuous latex layer.

The hard core polymer material used in the present exemplary system and method may be an optically clear or translucent polymer having a Tg above approximately 80 degrees Celsius. According to one exemplary embodiment, the hard core polymer material may include, but is in no way limited to, poly(methylmethacrylate), poly(tert-butylstyrene), poly (styrene), poly(p-methylstyrene), poly(t-butylacrylamide), poly(styrene-co-methylmethacrylate), poly(styrene-co-t-butylacrylamide), poly(methylmethacrylate-co-t-butylacrylamide), poly(methylmethacrylate-co-ethylmethacrylate), and homopolymers derived from tert-butyl methacrylate, p-cyanophenyl methacrylate, pentachlorophenyl acrylate, methacrylonitrile, isobornyl methacrylate, phenyl methacrylate, acrylonitrile, isobornyl acrylate, p-cyanophenyl acrylate, 2-chloroethyl acrylate, 2-chloroethyl methacrylate, 2-naphthyl acrylate, n-isopropyl acrylamide, 1-fluoromethyl methacrylate, isopropyl methacrylate, 2-hydroxyethyl methacrylate, tetrafluoroethylene, t-butyl methacrylate, and 2-hydroxypropyl methacrylate.

Surrounding the above-mentioned hard core material polymer is a soft shell hydrophilic polymer material. The shell material polymer used in one exemplary embodiment of the present system and method has a Tg lower than 70 degrees Celsius and displays adhesive properties at system temperatures. According to one exemplary embodiment, the present soft shell polymer material exhibits sufficient adhesive properties at system temperatures that a layer of hard core/soft shell latex adheres to itself as well as to a microporous substrate without the aid of adhesive. Soft shell polymers that may be used to form the soft shell polymer material include, but are in no way limited to, homo- and copolymers derived from the following monomers: n-butyl acrylate, n-ethylacrylate, 2-ethylhexylacrylate, methoxyethylacrylate, methoxyethoxy-ethylacrylate, ethoxyethylacrylate, ethoxyethoxyethylacrylate, 2-ethylhexyl-methacrylate, n-propylacrylate, hydroxyethylacrylate, tetrahydrofufuryl acrylate, cyclohexylacrylate, iso-decylacrylate, n-decylmethacrylate, n-propylacrylate, vinylacetate, 2-(N,N-Dimethylamino)ethyl methacrylate, 2-N-Morpholinoethyl acrylate, 3-Dimethylaminoneopentyl acrylate, and the like, as well as cationic monomers such as a salt of trimethylammoniumethyl acrylate and trimethylammoniumethyl methacrylate, a salt of triethylammoniumethyl acrylate and triethylammoniumethyl methacrylate, a salt of dimethylbenzylammoniumethyl acrylate and dimethylbenzylammoniumethyl methacrylate, a salt of dimethylbutylammonium-ethyl acrylate and dimethylbutylammoniumethyl methacrylate, a salt of dimethylhexylammoniumethyl acrylate and dimethylhexylammoniumethyl methacrylate, a salt of dimethyloctylammoniumethyl acrylate and dimethyloctyl-ammoniumethyl methacrylate, a salt of dimethyldodeceylammoniumethyl acrylate and dimethyldocecylammoniumethyl methacrylate, a salt of trimethyl-(4-vinylbenzyl)ammonium, a salt of triethyl-(4-vinylbenzyl)ammonium, a salt trimethylammoniumpropyl acrylate, a salt of dimethyloctadecyl-ammoniumethyl acrylate and dimethyloctadecylammoniumethyl methacrylate, etc. Salts of these cationic monomers which can be used include chloride, bromide, methylsulfate, triflate, etc.

Examples of these shell material polymers include poly(n-butylacrylate-co-vinylbenzyltrimethylammonium chloride), poly(n-butylacrylate-co-vinylbenzyltrimethylammonium bromide), poly(n-butylacrylate-co-vinylbenzyldimethylbenzylammonium chloride) and poly(n-butylacrylate-co-vinylbenzyldimethyloctadecylammonium chloride). According to one exemplary embodiment, the shell polymer can be poly (n-butyl acrylate co-trimethylammoniumethyl acrylate), poly (2-ethylhexyl acrylate co-trimethylammoniumethyl acrylate) poly(methoxyethylacrylate co-trimethylammoniumethyl acrylate), poly(ethoxy-ethylacrylate co-trimethylammoniumethyl acrylate), poly(n-butylacrylate-co-trimethylammoniumethyl acrylate), poly(n-butylacrylate-co-trimethylammoniumethyl methacrylate), poly(n-butylacrylate-co-vinylbenzyltrimethylammonium chloride), poly (n-ethylhexylacrylate-co-2-hydroxyethylacrylate co-trimethylammoniumethyl acrylate), poly (n-butylacrylate-co-2-hydroxyethylacrylate co-trimethylammoniumethyl acrylate), poly(n-ethylhexylacrylate-co-vinylbenzyltrimethylammonium chloride), poly(n-methoxyethylacrylate-co-vinyl benzyltrimethylammonium chloride), or poly(n-ethoxyethylacrylate-co-vinylbenzyltrimethylammonium chloride.

Table 1 below illustrates exemplary hard core/soft shell latexes that may be used according to one exemplary embodiment:

TABLE 1

| | Core Material (wt. %) | Shell Material (wt. %) |
|---|---|---|
| Latex 1 | Polystyrene (50) | Poly n-butylacrylate (50) |
| Latex 2 | Polystyrene (50) | Poly (n-ethylhexylacrylate-co-2-hydroxyethylacrylate) (40:10) |
| Latex 3 | Polymethylmethacrylate (60) | Poly (n-butylacrylate-co-2-hydroxyethylacrylate) (40:20) |
| Latex 4 | Polystyrene (70) | Poly n-ethoxyethylacrylate (30) |
| Latex 5 | Polymethylmethacrylate (70) | Poly 2-hydroxyethylacrylate (30) |
| Latex 6 | Polystyrene (40) | Poly (n-butylacrylate-co-trimethylammonium ethyl methacrylate) (40:20) |
| Latex 7 | Polymethylmethacrylate (40) | Poly (n-butylacrylate-co-trimethylammonium ethyl methacrylate) (40:20) |
| Latex 8 | Polystyrene (40) | Poly (n-butylacrylate-co-vinylbenzyltrimethyl-ammonium chloride) (40:20) |
| Latex 9 | Polymethylmethacrylate (40) | Poly (n-butylacrylate-co-vinylbenzyltrimethyl-ammonium chloride) (40:20) |
| Latex 10 | Polystyrene (40) | Poly (n-ethylhexylacrylate-co-2-hydroxyethylacrylate) (40:20) |

The recording agent used to record an image on the coated substrate may be any jettable ink or dye. The ink compositions used in inkjet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes.

The hard core/soft shell latex employed in the present system and method was prepared by a sequential emulsion polymerization technique. Synthesis of latex with core-shell morphology is described in "Emulsion Polymerization and Emulsion Polymers, ed." by P. A. Lovell and M. S. El-Aasser, Wiley, New York (1997), p. 293-323, incorporated herein by reference in its entirety. In general, the hard core polymer latex is polymerized first followed by the sequential feeding of the second low Tg monomer emulsions. A typical synthetic procedure of the hard core/soft shell latex of the present system and method is described below.

Exemplary Latex Fabrication Method

According to one exemplary embodiment, the hard core/soft shell latex is formed using the latex 2 formulation above having a size smaller than 200 nm. At this size, the hard core/soft shell latex exhibits increased self adhesion and may be deposited using little or no binder as will be explained further below. During formation, differing ratios of core and shell material may be used.

According to one exemplary embodiment, the hard core/soft shell latex is prepared by a sequential emulsion polymerization technique by first charging a mixture of 200 grams (g) water and 2 (g) of cetyltrimethylammonium bromide (CTAB) to a 2 L 3-neck flask equipped with a nitrogen inlet, a mechanical stirrer, and a condenser. The flask is immersed in a constant temperature bath at 80 degrees Celsius and purged with nitrogen for 20 min.

0.5 (g) of 2,2'-Azobis(2-methylpropionamidine) HCL salt is then added and followed by the addition of a monomer emulsion made up of 200 (g) of Styrene, 2 (g) of 2,2'-Azobis (2-methylpropionamidine) HCL salt, 20 (g) of CTAB, and 200 (g) of Deionized Water. The mixture is continually agitated during the feeding of the monomer emulsion. The monomer emulsion is withdrawn from the bottom of the monomer reservoir with a Fluid Metering Pump. The addition time of the monomer emulsion is approximately one hour and twenty minutes. The polymerization is continued for 30 min after the addition of the first monomer.

A second monomer emulsion including 160 (g) of Butyl Acrylate, 40 g of 2-hydroxyethylacrylate, 2 (g) of 2,2'-Azobis (2-methylpropionamidine) HCL salt, 20 (g) of CTAB (20), and 200 (g) of Deionized Water may then be prepared in the same way. The total addition time being one hour and twenty minutes. The latex is heated at 80 degrees Celsius for one hour and cooled to 60 degrees Celsius.

4 milliliters of 10% t-butyl hydroperoxide and 10% formaldehyde-sulfite are then added to remove the residual monomer and held for 30 minutes. After being held for 30 minutes, the mixture may be cooled to room temperature and filtered. The above-mentioned method produces a particle size of approximately 120 nm.

The above-mentioned latex fabrication method is provided as an exemplary procedure only and should not limit the present system and method in any way. To the contrary, any number of ingredients and methods may be used to produce the present hard core/soft shell latex.

Exemplary Implementation and Operation

Figure 3:
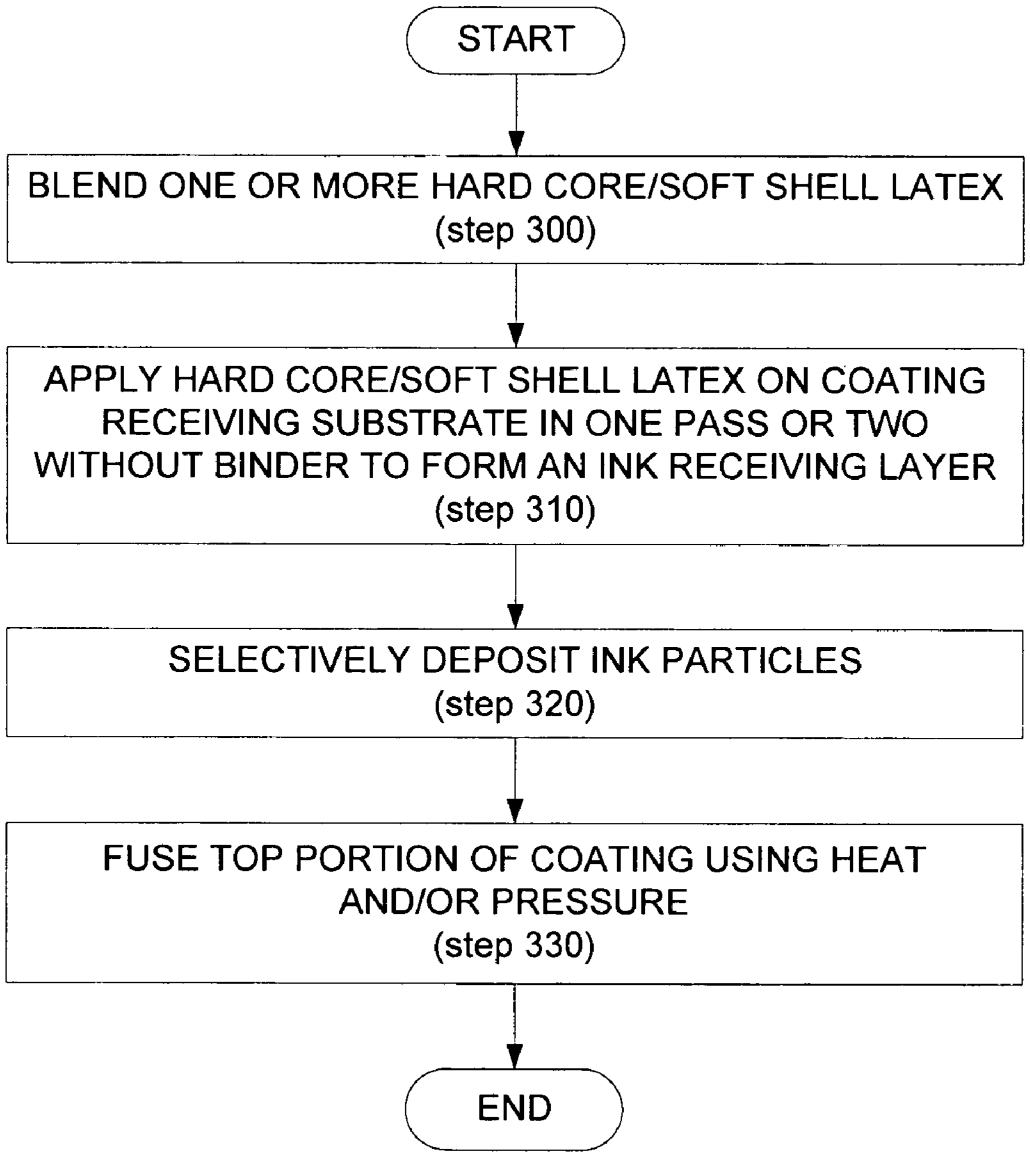
FIG. 3 is a flow chart illustrating a method for generating an ink receptive coating according to one exemplary embodiment.

FIG. 3 is a flow chart illustrating an exemplary method for coating a desired substrate with a hard core/soft shell latex according to one exemplary embodiment. As illustrated in FIG. 3, the present method may begin by blending one or more hard core/soft shell latexes (step 300). Once the latex is blended, the hard core/soft shell latex may be applied to a coating receiving substrate in one pass or two using little or no binder to form an ink receiving layer (step 310). Once the ink receiving layer is formed, ink or other recording liquids may be selectively deposited on the ink receiving layer (step 320). When all of the recording liquids have been selectively placed on the coating receiving substrate, the top portion of the hard core/soft shell latex coating is sealed using heat and/or pressure (step 330). Each of the above-mentioned steps of FIG. 3 will now be explained in detail with reference to FIGS. 4A through 4D.

As shown in the flow chart of FIG. 3, one exemplary embodiment of the present method begins by blending one or more hard core/soft shell latexes (step 300). The hard core/soft shell latex used in the present system and method may be blended according to the exemplary methods illustrated above. As noted above, the hard core/soft shell latexes produced according to the present exemplary methods differ from traditional hard core/soft shell latexes in their Tg ranges. According to the present system and method, the Tg range for the soft shell component may range up to 70 degrees Celsius and may range as low as 80 degrees Celsius for the hard core. Moreover, the hard core/soft shell latexes blended according to the methods mentioned above may be applied to a coating receiving substrate using little or no binder and in a porous configuration.

Figure 4A:
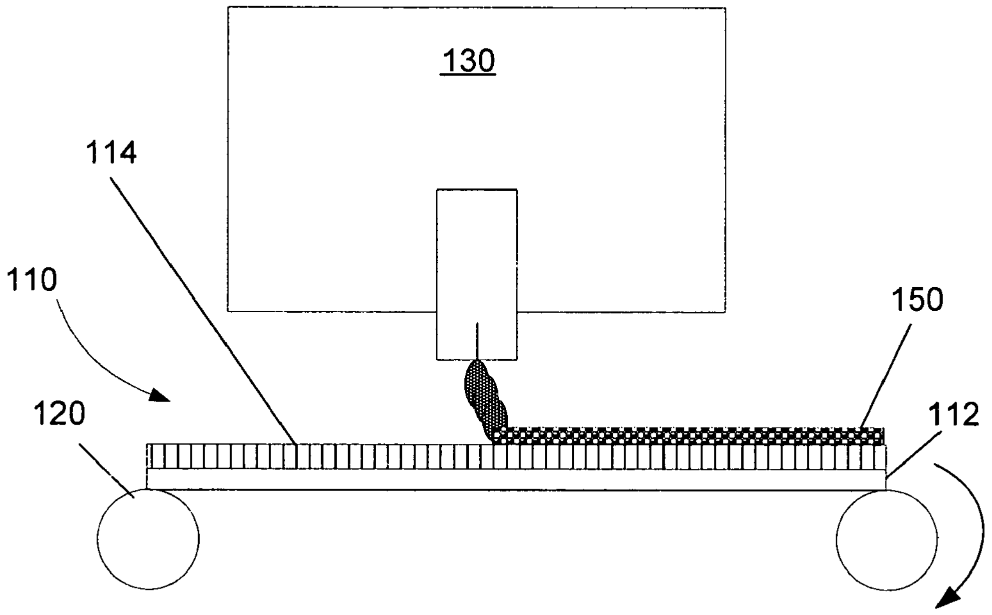
FIG. 4A is a cross-sectional view illustrating the application of a hard core/soft shell latex onto a substrate according to one exemplary embodiment.

Once the hard core/soft shell latexes are blended (step 300), the hard core/soft shell latex is selectively applied on a coating receiving substrate in one pass or two using little or no binder to form an ink receiving layer (step 310). The application of the hard core/soft shell latex (150) is illustrated in FIG. 4A. As shown in FIG. 4A, the coating receiving substrate may be an ink receptive medium (110) including a photo or film base (112) having a microporous substrate (114) disposed thereon. While the present exemplary system and method are described herein as being applied onto a coating receiving substrate including an ink receptive medium (110), the application should in no way be limited to applying hard core/soft shell latex to an ink receptive medium. Rather, the present system and method may be used to form a binder free microporous ink receptive coating on any number of mediums including, but in no way limited to, an existing microporous layer, a paper or photo based substrate, or it may be formed as a self standing layer. According to one exemplary embodiment, a mixture of two or more lattices, having a hard core/soft shell latex as the major ingredient, may be coated 1 to 2 grams per square meter (GSM) thick on another microporous ink receptive layer. Moreover, the layer of hard core/soft shell latex (150) may be applied wet on dry as illustrated in FIG. 4A, or alternatively wet on wet. In an alternative embodiment, a 20 to 40 GSM thick layer of the above-mentioned mixture is coated on a photo base or a paper base and allowed to dry. According to the present system and method, the density of the microporous ink receptive layer may range from 10 to 50 GSM and the top core-shell latex layer may range from 0.1 to 10 GSM.

FIG. 4A further illustrates a coating applicator (130) depositing the hard core/soft shell latex material (150) onto the ink receptive medium. According to one exemplary embodiment, the coating applicator (130) may include, but is in no way limited to, a slot applicator, a roll applicator, a cascade applicator, a slide applicator, a blade applicator, a wire applicator, inkjet dispensers, or any other known liquid coating technique. Moreover, the coating applicator (130) used may be stationary, it may independently translate over the surface of the ink receptive medium (110), and/or the ink receptive medium may be translated by a medium transport device (120) as mentioned above.

According to one exemplary embodiment of the present system and method, the hard core/soft shell latex material (210) may be deposited using little or no binder material. Rather, the operating temperatures of the present system and method are sufficiently close to the Tg of the soft shell latex portion of the hard core/soft shell latex material (210) that the surface of the soft, low Tg shell becomes sticky and adheres to the surface of other soft shells, thereby adhering to itself and the ink receptive medium (110). Additionally, a coalescing agent may be added to the latex to effectively lower the Tg of the shell for soft shells having a higher than process temperature Tg. Coalescing agents that may be added to the hard core/soft shell latex (210) include, but are in no way limited to, ethylene glycol, propylene glycol, hexylene glycol, ester of ethylene glycol, propylene glycol, hexylene glycol, 2-butoxyethanol, 2,2,4-trimethylpentanediol monoisobutyrate, diisobutyl esters of a mixture of diacids, butyl cellulose, 2-(2-butoxyethoxy)ethanol, 2-butoxyethanol, Rhodiasolve DIB® (by Rhodia Chemical), TEXANOL® (by Eastman Chemical), diisobutyl succinate, diisobutyl glutarate, diisobutyl adipate, SER-AD FX-510® (by Sasol Chemical), and SER-AD FX-511® (by Sasol Chemical), etc. Moreover, the particles of the hard core/soft shell latex (210) are formed to be smaller than traditional hard core/soft shell latexes in order to facilitate efficient packing (less than 200 nm). This efficient packing allows a larger percentage of surface area of each hard core/soft shell latex particle to come into contact with the surface of another, thereby facilitating the adherence. Additionally, the binder may be eliminated from the present hard core/soft shell latex (210) because when used in layered applications, any adhesive located on the base layer of the ink receptive medium (110) may migrate to the deposited layer of hard core/soft shell latex (210) thereby aiding in the binding of the material.

Alternatively, if binders are desired, a number of binders may be included including, but in no way limited to, water soluble polymers and polymeric latex or emulsions. Examples of water soluble polymers include, but are in no way limited to, polyvinylalcohol, copolymer of polyvinylalcohol, gelatin, polyvinylpyrrolidone, polyacrylic acid, polyacrylamide, etc. Low Tg (<30° C.) polymer latexes or emulsions can also be used as extra binders for the hard core/soft shell latex. Exemplary low Tg polymer latexes include, but are in no way limited to, poly(styrene-co-butadiene), poly (butylacrylate), poly(ethylacrylate), poly(2-ethoxyethylacrylate), poly(tetrahydrofufrylacrylate), poly(2-methoxyethylacrylate), etc. Polyurethane dispersions that may be used include, but are in no way limited to, WITCOBOND (of Crompton Corp.), BEETAFIN (BIP Limited), CYDROTHANE (Cytec Industries, Inc.), SYNTEGRA (Dow Chemical), Bayhydrol (Bayer Polymers), Neorez (Avecia), etc. Moreover, exemplary polyester dispersions include, but are in no way limited to, AQ dispersion (Eastman Chemical), etc.

Figure 4B:
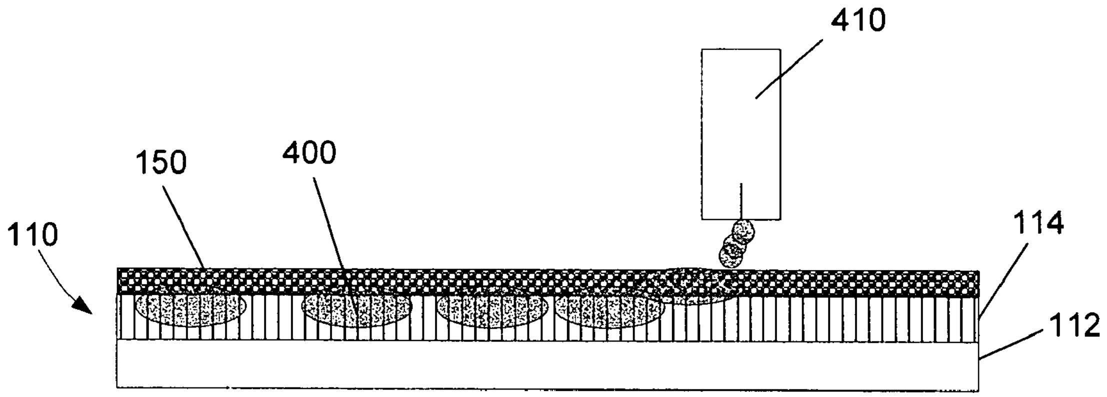
FIG. 4B is a cross-sectional view illustrating the application of a recording agent onto a microporous ink receptive coating according to one exemplary embodiment.

When the hard core/soft shell latex is applied to the ink receptive medium (110), the present system and method may selectively deposit ink particles to form a desired image (step 320; FIG. 3). As shown in FIG. 4B, the hard core/soft shell latex (210) covers a substantial portion of the ink receptive medium (110). An inkjet dispenser (410) may then selectively deposit ink (400) or another recording medium onto the layer of hard core/soft shell latex (210). Photographic-quality images may be formed and maintained using the present system and method because little or no binder is included in the hard core/soft shell latex layer (210). By using little or no binder material, the present layer of hard core/soft shell latex (210) is readily wetted thereby preventing puddling and coalescence of adjacent ink (400). Moreover, the porous nature of the present hard core/soft shell latex (210) as well as the elimination or reduction in binder material allows the ink (400) to rapidly absorb through the layer of hard core/soft shell latex (210) and into the microporous substrate (114).

The inkjet dispenser (410) used to dispense the ink (400) or other recording medium may be may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

Figure 4C:
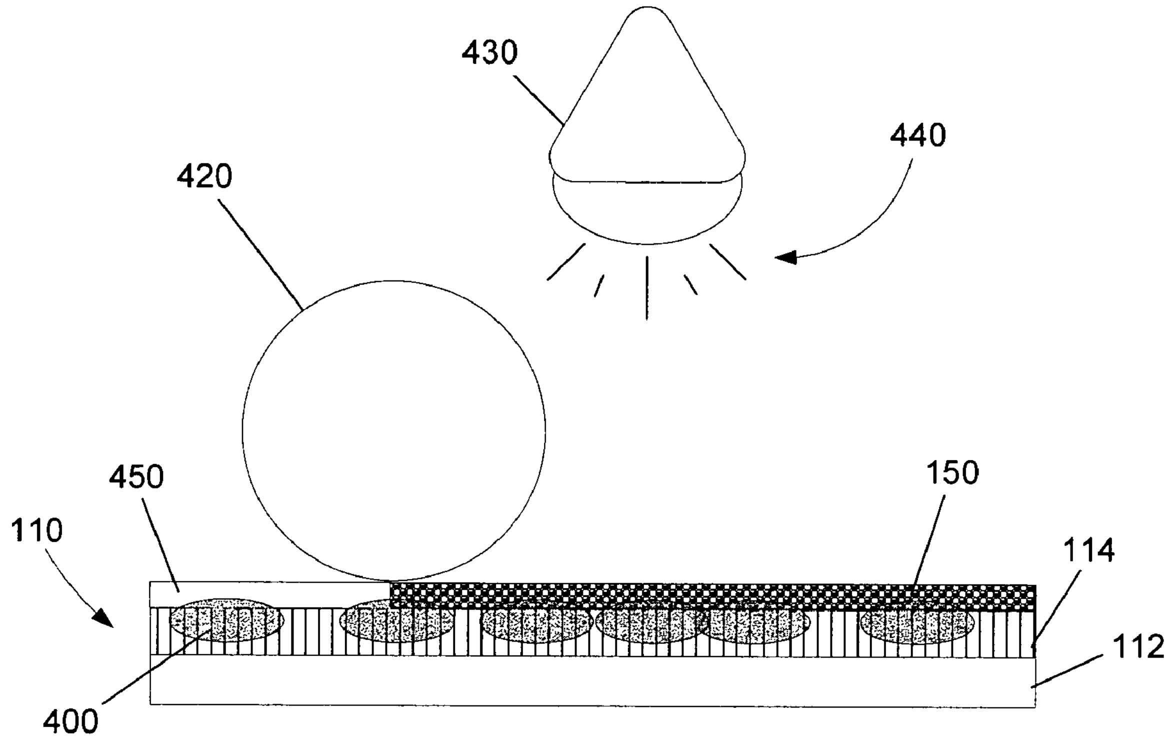
FIG. 4C is a cross-sectional view illustrating the application of heat and/or pressure to seal a latex coating according to one exemplary embodiment.

Once the ink (400) or other recording medium has been permitted to absorb into the microporous substrate (114), the top portion of the hard core/soft shell latex (210) may be fused using heat and/or pressure (step 330; FIG. 3). FIG. 4C illustrates the fusing of the hard core/soft shell latex (210) according to one exemplary embodiment. As shown in FIG. 4C, a roller (420) and/or an independent thermal applicator (430) may be used to provide heat and/or pressure to the hard core/soft shell latex (210). The roller (420) used in the present exemplary embodiment may be configured to impart heat and/or pressure to the hard core/soft shell latex (210). According to one exemplary embodiment, the roller (420) may be heated to apply thermal energy to the hard core/soft shell latex (210). Alternatively, an independent thermal applicator (430) may be included in the present system and method. As shown in FIG. 4C, the thermal applicator (430) may be any device configured to apply thermal energy (440) to the hard core/soft shell latex (210). Regardless of the method for applying the heat and/or pressure, the present hard core/soft shell latex (210) may melt and fuse to form a continuous film when sufficient thermal energy is provided to raise the latex temperature above the Tg of the soft shell. According to one exemplary embodiment, sufficient thermal energy is provided to raise the latex temperature to between approximately 100 to 250 degrees Celsius depending on the fusing speed.

FIG. 4C also illustrates an exemplary change that occurs in the hard core/soft shell latex (210) through the application of heat and/or pressure. As shown in FIG. 4C, when first deposited, the microporous hard core/soft shell latex (210) diffuses light. However, with the application of heat and/or pressure, the soft shell portion of the latex (210) is raised above its Tg so that it melts to a flowable state. The latex (210) is then allowed to flow and fuse until it forms a continuous film (450). Fusion time is also reduced by the elimination or reduction of binder material in the hard core/soft shell latex (210).

Figure 4D:
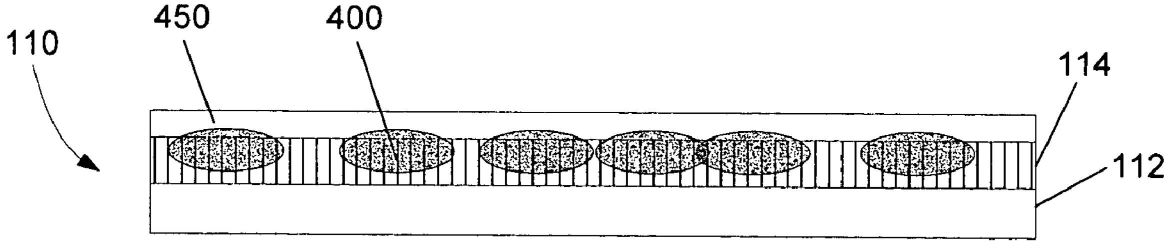
FIG. 4D is a cross-sectional view illustrating a sealed latex surface coat according to one exemplary embodiment.

FIG. 4D illustrates a fused continuous film (450) on top of a formed image. As shown in FIG. 4D, the fused continuous film (450) is transparent to facilitate observation of the deposited ink (400) forming an image. The fused continuous film also serves as a scratch resistant coating that protects the formed image as well as adding durability due to the hard core of the latex.

In conclusion, the present system and method for generating a binder free microporous ink receptive coating using hard core/soft shell latex eliminates a number of issues related to coating multiple layers having binder material. More specifically, by greatly reducing or eliminating the binder material during the deposition of a hard core/soft shell latex, incompatibility between layers is reduced, porosity of the hard core/soft shell latex layer is increased, and the fusion rate of ink through the latex layer and onto the porous ink receiving surface is increased. All of these advantages prevent coalescence problems and improve the overall image quality.

Additionally, the present system and method provides for the sealing or fusing of the hard core/soft shell latex once a desired image has been formed. The ability to fuse the hard core/soft shell latex layer increases the toughness and scratch resistance of the top latex layer.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A print medium having a microporous coating comprising:

a substrate which serves as a base of said print medium;

a first microporous layer comprising a first binder; and a fusible latex layer deposited over said first microporous layer, wherein said fusible latex layer is microporous and includes particles comprising a hard core material and a soft shell material;

wherein said latex exhibits self-adhesive properties at a room temperature such that said latex layer remains in place on said first microporous layer without requiring a second binder and without being fused;

wherein said latex layer is ink permeable and permits the transmission of ink through said latex layer to said first microporous layer prior to said fusible latex layer being fused.

2. The print medium having a microporous coating of claim 1, wherein, after a printing process in which ink has passed through said latex layer, said latex is for forming a fused, continuous transparent film by the application of thermal energy or pressure.

3. The print medium having a microporous coating of claim 2, wherein said hard core material exhibits a glass transition temperature above 80 degrees Celsius and said soft shell material exhibits a glass transition temperature below 70 degrees Celsius.

4. The print medium having a microporous coating of claim 3, wherein said hard core material comprises one of poly (methylmethacrylate), poly(styrene), poly(p-methylstyrene), poly(t-butylacrylamide), poly(styrene-co-methylmethacrylate), poly(styrene-co-t-butylacrylamide), poly(methylmethacrylate-co-t-butylacrylamide), or homopolymers derived from p-cyanophenyl methacrylate, pentachlorophenyl acrylate, methacrylonitrile, isobornyl methacrylate, phenyl methacrylate, acrylonitrile, isobornyl acrylate, p-cyanophenyl acrylate, 2-chloroethyl acrylate, 2-chloroethyl methacrylate, 2-naphthyl acrylate, n-isopropyl acrylamide, 1-fluoromethyl methacrylate, isopropyl methacrylate, or 2-hydroxypropyl methacrylate.

5. The print medium having a microporous coating of claim 3, wherein said soft shell material comprises a cationic monomer or a salt of a cationic monomer.

6. The print medium having a microporous coating of claim 5, wherein said soft shell material comprises one of poly(n-butyl acrylate co-trimethylammoniumethyl acrylate), poly(2-ethylhexyl acrylate co-trimethylammoniumethyl acrylate) poly(methoxyethylacrylate co-trimethylammoniumethyl acrylate), poly(ethoxy-ethylacrylate co-trimethylammoniumethyl acrylate), poly(n-butylacrylate-co-trimethylammoniumethyl acrylate), poly(n-butylacrylate-co-trimethylammoniumethyl methacrylate), poly(n-butylacrylate-co-vinylbenzyltrimethylammonium chloride), poly (n-ethylhexylacrylate-co-2-hydroxyethylacrylate co-trimethylammoniumethyl acrylate), poly (n-butylacrylate-co-2-hydroxyethylacrylate co-trimethylammoniumethyl acrylate), poly(n-ethylhexylacrylate-co-vinylbenzyltrimethylammonium chloride), poly(n-methoxyethylacrylate-co-vinylbenzyltrimethylammonium chloride), or poly(n-ethoxyethylacrylate-co-vinylbenzyltrimethylammonium chloride).

7. The print medium having a microporous coating of claim 1, wherein said latex further comprises a coalescing agent.

8. The print medium having a microporous coating of claim 7, wherein said coalescing agent comprises one of ethylene glycol, propylene glycol, hexylene glycol, ester of ethylene glycol, propylene glycol, hexylene glycol, 2-butoxyethanol, 2,2,4-trimethylpentane diol monoisobutyrate, diisobutyl esters of a mixture of diacids, butyl cellulose, 2-(2-butoxyethoxy)ethanol, 2-butoxyethanol, diisobutyl succinate, diisobutyl glutarate, diisobutyl adipate.

9. The print medium having a microporous coating of claim 3, wherein said soft shell material comprises one of a homo- or copolymer derived from n-butyl acrylate, n-ethylacrylate, 2-ethylhexylacrylate, methoxyethylacrylate, methoxyethoxy-ethylacrylate, ethoxyethylacrylate, ethoxyethoxyethylacrylate, 2-ethylhexylmethacrylate, n-propylacrylate, hydroxyethylacrylate, tetrahydrofufuryl acrylate, cyclohexylacrylate, iso-decylacrylate, n-decylmethacrylate, n-propylacrylate, vinylacetate, 2-(N,N-dimethylamino)ethyl methacrylate, 2-N-morpholinoethyl acrylate, or 3-dimethylaminopentyl acrylate.

10. The print medium having a microporous coating of claim 3, wherein said soft shell material comprises one of tetrahydrofufuryl acrylate, cyclohexylacrylate, iso-decylacrylate, n-decylmethacrylate, vinylacetate, 2-(N,N-Dimethylamino)ethyl methacrylate, 2-N-Morpholinoethyl acrylate, or 3-Dimethylaminoneopentyl acrylate.

11. The print medium having a microporous coating of claim 1, wherein core material comprises more than 50% by weight of said particles.

12. The print medium having a microporous coating of claim 1, wherein core material comprises polystyrene and is 50% by weight of said particles, and said shell material comprises n-ethylhexylacrylate that is 40% by weight of said particles and 2-hydroxyethylacrylate that is 10% by weight of said particles.

13. The print medium having a microporous coating of claim 1, wherein core material comprises polystyrene and is 70% by weight of said particles, and said shell material comprises ethoxyethylacrylate and is 30% by weight.

14. The print medium having a microporous coating of claim 1, wherein core material comprises polymethylmethacrylate and is 70% by weight of said particles, and said shell material comprises 2-hydroxyethylacrylate and is 30% by weight.

15. The print medium having a microporous coating of claim 1, wherein core material comprises polystyrene and is 40% by weight of said particles, and said shell material comprises n-ethylhexylacrylate that is 40% by weight of said particles and 2-hydroxyethylacrylate that is 20% by weight of said particles.

16. The print medium having a microporous coating of claim 1, wherein said first microporous layer further comprises aluminum.

17. The print medium having a microporous coating of claim 1, wherein said particles are smaller than 200 nm.

18. The print medium having a microporous coating of claim 1, wherein said shell material has a Tg from above 20° C. up to 70° C.

19. The print medium having a microporous coating of claim 1, wherein said fusible latex layer is coating at 1 to 2 grams per square meter on said first microporous layer.

20. The print medium having a microporous coating of claim 1, wherein said first microporous layer is 10 to 50 grams per square meter and said fusible latex layer is 0.1 to 10 grams per square meter.

21. The print medium having a microporous coating of claim 1, wherein said shell material comprises a coalescing agent that lowers the Tg of a shell of said particles.

* * * * *

UNITED STATES PATENT AND TRADEMARK OFFICE

CERTIFICATE OF CORRECTION

PATENT NO. : 7,914,864 B2
APPLICATION NO. : 10/789963
DATED : March 29, 2011
INVENTOR(S) : Sen et al.

It is certified that error appears in the above-identified patent and that said Letters Patent is hereby corrected as shown below:

In column 11, line 47, in Claim 9, delete “tetrahydrofufuryl” and insert -- tetrahydrofurfuryl --, therefor.

In column 12, line 3, in Claim 10, delete “tetrahydrofufuryl” and insert -- tetrahydrofurfuryl --, therefor.

Signed and Sealed this
Twenty-eighth Day of June, 2011

David J. Kappos
*Director of the United States Patent and Trademark Office*